United States Patent [19]

Yamanashi et al.

[11] 4,172,568
[45] Oct. 30, 1979

[54] SEAT BELT RETRACTOR WITH TENSION ELIMINATOR

[75] Inventors: Chusaku Yamanashi, Kosai; Shigeo Fukuda, Yokohama, both of Japan

[73] Assignees: Nissan Motor Company, Limited, Yokohama; Fuji Kiko Company, Limited, Tokyo, both of Japan

[21] Appl. No.: 933,068

[22] Filed: Aug. 11, 1978

[30] Foreign Application Priority Data

Aug. 17, 1977 [JP] Japan .......................... 52-110395[U]

[51] Int. Cl.² ...................... B65H 75/48; A62B 35/02
[52] U.S. Cl. .................................. 242/107.6; 297/475
[58] Field of Search .......... 242/107.6, 107.7, 107.4 R, 242/107.4 E; 297/388; 280/744–747; 180/82 C

[56] References Cited

U.S. PATENT DOCUMENTS

| | | | |
|---|---|---|---|
| 3,912,035 | 10/1975 | Ulert | 242/107.6 X |
| 3,917,189 | 11/1975 | Bryll | 242/107.6 X |
| 3,957,223 | 5/1976 | Colasanti et al. | 242/107.6 |

*Primary Examiner*—Harvey C. Hornsby
*Assistant Examiner*—John M. Jillions

[57] ABSTRACT

A seat belt retractor with a tension eliminator is provided with a ratchet wheel arrangement which acts as a position memory upon closing of a buckle switch and which is responsive to the belt webbing being drawn off the reel of the retractor by a seat occupant leaning forward beyond a predetermined distance, the wheel being rotated via an internal/planetary gear arrangement, proportionally to the excess distance whereupon the webbing can be retracted only said predetermined distance inducing a degree of tension eliminating slack in the webbing upon return of the occupant to the position in which he or she buckles the seat belt.

6 Claims, 4 Drawing Figures

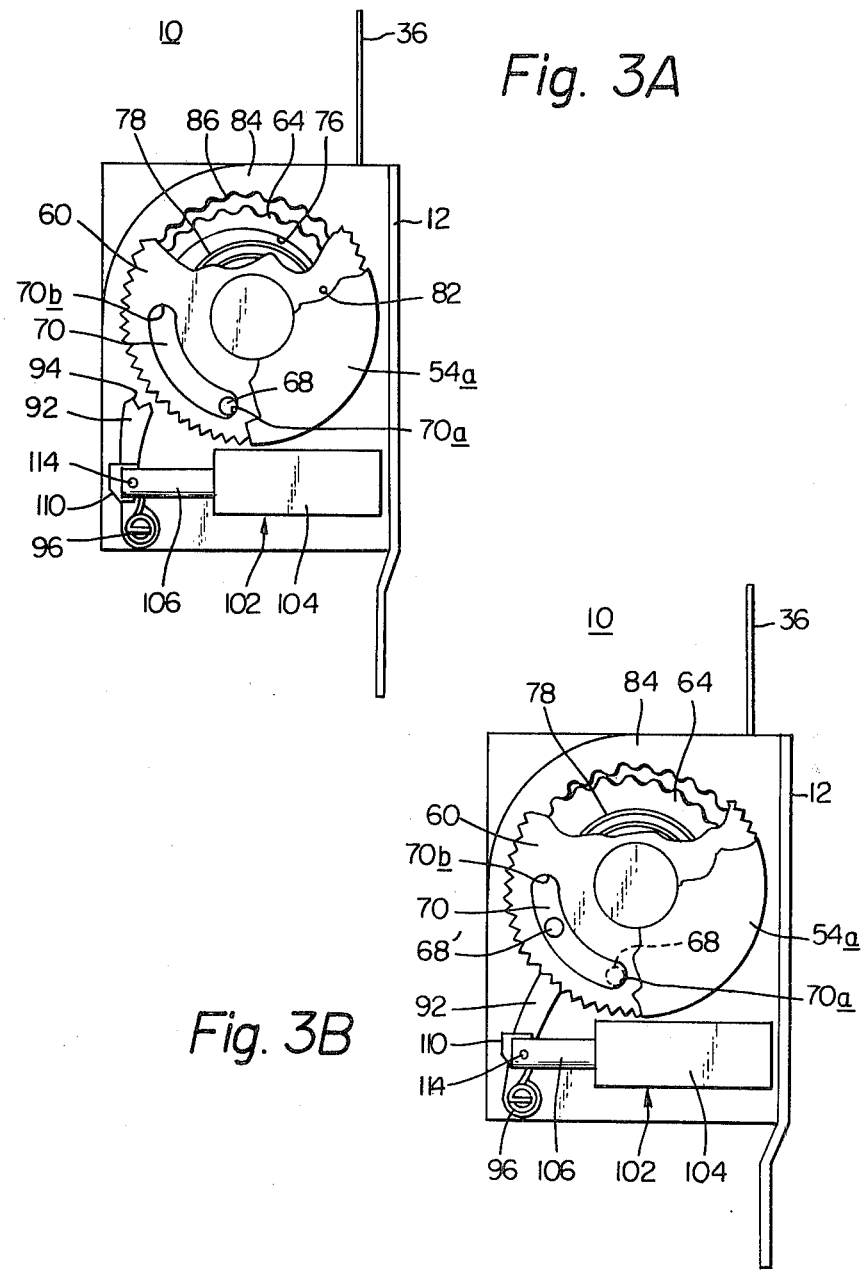

SEAT BELT RETRACTOR WITH TENSION ELIMINATOR

FIELD OF THE INVENTION

The present invention relates in general to a safety seat belt arrangement equipped in vehicles, and more particularly to a seat belt retractor of a type having tension eliminator.

BACKGROUND OF THE INVENTION

Some seat belt retractors are so designed as to permit the retractor to exert a retracting force on the belt at all times irrespective of the posture assumed by the passenger restrained thereby. Thus the belt always applies pressure to the body of the passenger to induce discomfort and increase the rate of fatigue. Thus, hitherto, some passengers have avoided the use of seat belts for the reasons just set forth.

SUMMARY OF THE INVENTION

Accordingly, it is an object of the present invention to provide an improved seat belt retractor which can eliminate the drawbacks mentioned above.

It is another object of the present invention to provide an improved seat belt retractor which can eliminate the tension applied to the wearer's body when the wearer assumes a position in which the lumber and dorsal portions of the wearer's back are pressed against the backrest of the seat viz. assumes a fully restrained position.

It is still another object of the present invention to provide an improved seat belt retractor which has a position memory responsive to the belt being drawn out of the retractor in excess of a predetermined length so as to be reset and permit the belt to be retracted only said predetermined length whereby on return of the passenger or wearer to the fully restrained position no tension is exerted on his or her body via the belt.

According to the present invention, there is provided a belt retractor for a safety seat belt arrangement having a webbing, comprising a housing; a reel axially rotatably mounted in the housing, the webbing being connected at its one end to the reel so as to be wound on the reel when the reel rotates about the axis thereof in one direction, the reel being formed at the longitudinal end thereof with first and second bearing portions which are respectively concentric and eccentric with respect to the longitudinal axis of the reel; first biasing means for biasing the reel to rotate in the one direction; a wheel journaled on the first bearing portion; a stopper engageable with the wheel to prevent rotation of the wheel about its axis in opposite direction with respect to the one direction of the reel while permitting rotation of same in the same direction as the one direction; second biasing means for biasing the stopper to move in a direction to be disengaged from the wheel; a planetary gear journaled on the second bearing portion of the reel; third biasing means for biasing the wheel to rotate in the same direction as the one direction relative to the planetary gear; an internal gear stationarily connected to the housing at a position to be operatively engageable with the planetary gear, the planetary gear having a projection which is spacedly received in an arcuate opening formed in the wheel, the arcuate opening having the same center as the wheel; and actuating means for causing the stopper to be brought into engagement with the wheel against the force of the second biasing means when the webbing takes the passenger restraining position.

SUMMARY OF THE DRAWINGS

Other objects and advantages of the present invention will become clear from the following description when taken in conjunction with the accompanying drawings, in which:

FIGS. 3A and 3B are views showing the seat belt retractor when a tongue and a buckle of the seat belt are disengaged and when the vehicle passenger wearing the seat belt leans forward, respectively.

DESCRIPTION OF THE PREFERRED EMBODIMENT

Figure 1:
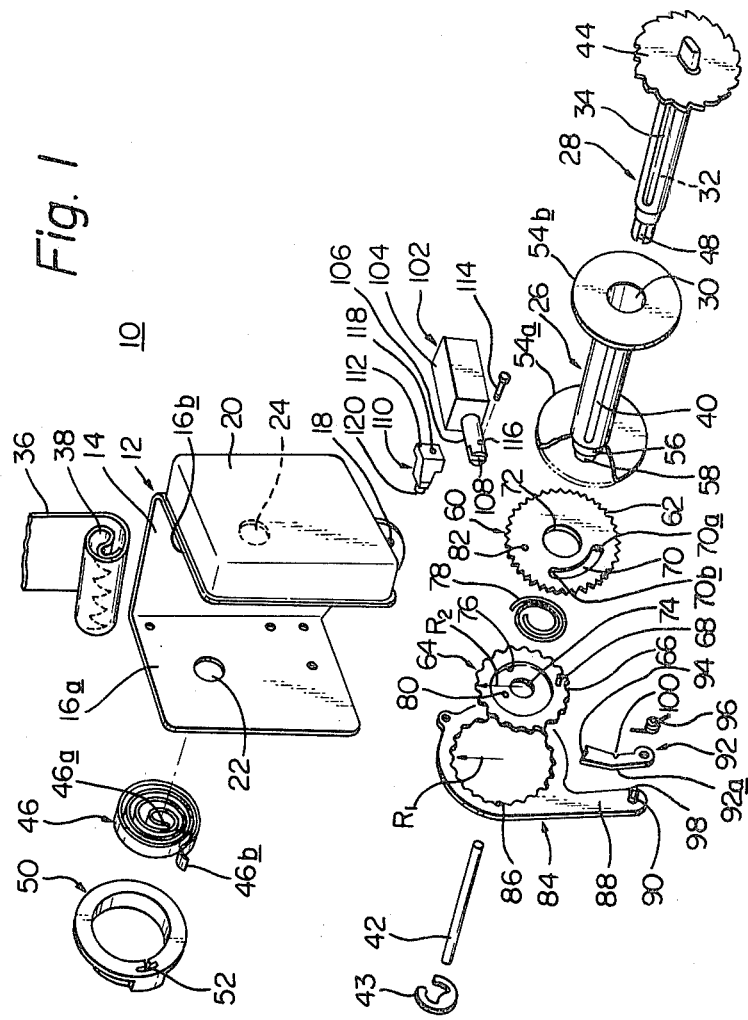
FIG. 1 is an exploded view of a seat belt retractor according to the invention.

Referring to the drawings, especially to FIG. 1, there is illustrated a preferred embodiment of a seat belt retractor of the invention, as being generally designated by numeral 10.

Figure 2:
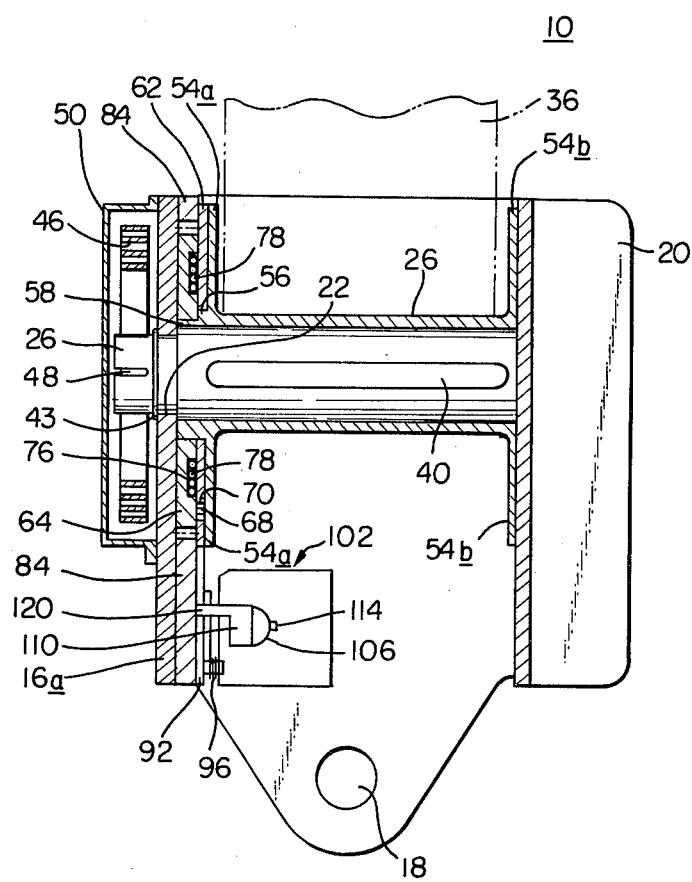
FIG. 2 is a front, but partially sectioned view of the seat belt retractor of the invention.

The seat belt retractor 10, shown in FIG. 1, comprises a generally U-shaped housing 12 having a base portion 14 and a pair of side wall portions 16a and 16b. The housing 12 is adapted to connect to a suitable body portion of a vehicle by using bolts (not shown) passing through holes 18 formed in the base portion 14. By the reason which will become clear hereinlater, a box-shaped cover 20 is attached to the outside of the side wall portion 16b, as shown. The wall portions 16a and 16b have respective aligned holes 22 and 24 and receive therebetween a reel 26 in a manner that the axis of the reel 26 is aligned with the axes of the holes 22 and 24. A shaft 28 is adapted to pass through an axial hole 30 of the reel 26 with the ends thereof rotatably journaled in the holes 22 and 24 of the side wall portions 16a and 16b so that the reel 26 is rotatably supported in the housing 12. The shaft 28 is formed with an axially extending blind bore 32 and a longitudinally extending slit 34 which is merged with the blind bore 32. A webbing 36 having a looped end 38 is passed through a longitudinally extending slit 40 formed in the reel 26 and through the slit 34 of the shaft 28 allowing the looped end 38 thereof to be received in the blind bore 32 of the shaft 28. The webbing 36 is wound on the reel 26 and the looped end 38 thereof is retained by a pin 42 which passes through a loop formed by the looped end 38. A snap ring 43 is fixed to the left end of the shaft 28 which is projected from the wall portion 16a as will be well understood from FIG. 2, so that the shaft 28 is retained in the reel 26 without being accidentally removed therefrom. With this, the reel 26 and the shaft 28 constitute a unit which is rotatable about the axis of the shaft 28 relative to the housing 12 in response to the winding and unwinding of the webbing on and off the reel 26. As shown in the drawing, the right end of the shaft 28 has a ratchet wheel 44 fixed thereto and which is adapted to be housed in the cover 20. Although not shown in the drawing, a pawl is also housed in the cover 20 to be engageable with the ratchet wheel 44 to constitute a so-called "Emergency Locking Mechanism" which functions to lock the shaft 28 thus stopping the feeding of the webbing 36 from the reel 26 when the vehicle encounters abnormal rapid deceleration due to, for example, a vehicle collision.

Located outside of the wall portion 16a of the housing 12 is a spiral spring 46 which is held in a cover 50 firmly attached to the wall portion 16a in a suitable manner. An inner end 46a of the spring 46 is held in a slit 48 formed in the left end of the shaft 28 and an outer end of the same is held in a slit 52 formed in the cover 50 so that the shaft 28 and thus the reel 26 are biased to rotate in a direction to wind the webbing 36 thereon.

The reel 26 has at both ends circular flanges 54a and 54b which are coaxial with the shaft 26. The left end of the reel 26, which is located outboard of the flange 54a, has both a cylindrical concentric bearing portion 56 concentric with the reel 26 and a cylindrical eccentric bearing portion 58 eccentric to the reel 26. As will be seen from FIG. 2, the eccentric bearing portion 58 is positioned at the extreme end of the reel 26.

A ratchet wheel 60 having a plurality of external teeth 62 is rotatably journaled on the cylindrical concentric bearing portion 56 and a planetary gear 64 having a plurality of external teeth 66 is rotatably journaled on the eccentric bearing portion 58. The planetary gear 64 is provided at its one side with a stud or pin 68 which is to be spacedly received in an arcuate slot 70 formed in the ratchet wheel 60. The arcuate slot 70 is formed so that the center of curvature thereof is concentric with the center of the center opening 72 of the ratchet wheel 60, the center opening 72 being the through hole through which the cylindrical concentric bearing portion 56 of the reel 26 is rotatably disposed. Thus, it is to be appreciated that relative rotation between the ratchet wheel 60 and the planetary gear 64 is possible within a certain range which is determined by the engagement of the stud 68 with end sections 70a and 70b of the slot 70. As shown, the planetary gear 64 is formed with a circular recess or depression 76 which is concentric with a central opening 74 thereof, the opening 74 being the hole in which the cylindrical eccentric bearing portion 58 of the reel 26 is rotatably disposed.

A spiral spring 78 is received in the circular recess 76 of the planetary gear 64. Inner and outer ends (no numerals) of the spring 78 are respectively held in respective holes 80 and 82 formed in the planetary gear 64 and the ratchet wheel 60 so that the ratchet wheel 60 is biased to rotate in a clockwise direction, in this drawing, relative to the planetary gear 64. Thus, in normal condition, the stud 68 is kept engaged with the end section 70a of the arcuate slot 70.

Disposed about the planetary gear 64 is an internal gear 84 which is firmly attached to the inside surface of the wall portion 16a of the housing 12 in a manner that internal teeth 86 thereof are operatively engageable with the teeth 66 of the planetary gear 64. The internal gear 84 is provided with a downwardly extending arm 88 the leading end of which is provided with a stud or pin 90 which extends parallel with the shaft 28. Swingably mounted on the stud 90 is a stopping lever or ratchet 92 which has at its free end teeth 94 engageable with the teeth 62 of the ratchet wheel 60 to prevent the rotation of the ratchet wheel 60 in the counterclockwise direction while permitting the rotation of same in the clockwise direction. A spring 96 is disposed about the stud 90 over the lever 92 with both ends thereof respectively held in a slit 98 formed in the stud 90 and a notch 100 formed in the lever 92 so that the lever 92 is biased to swing in a direction to be disengaged from the ratchet wheel 60. As will be seen hereinlater, the meshing engagement of the stopping lever 92 with the ratchet wheel 60 occurs when the tongue and buckle of the seat belt are engaged.

Denoted by numeral 102 is an electric actuator which comprises a casing 104 fixed to the inner side of the wall portion 16a of the housing 12, a solenoid (not shown) held in the casing 104, and a plunger 106 operatively connected to the solenoid. In the embodiment hereinshown, the actuator 102 is so constructed as to retract the plunger 106 toward the casing 104 when the solenoid in the casing 104 is electrically energized. The plunger 106 is formed at its leading end with a slit 108 into which an edge portion 112 of a head member 110 is disposed. A bolt 114 passes through an opening 116 of the plunger 106 and an opening 118 of the head member 110 to tightly fix the head member 110 to the plunger 106. The head member 110 is formed with a projection 120. The electric actuator 102 is so positioned as to allow the projection 120 to contact with a portion 92a of the lever 92, so that when the plunger 106 is retracted into the casing 104 due to energization of the solenoid, the lever 92 is forced to swing clockwisely, that is in a direction to cause the teeth 94 of the lever 92 to engage with the teeth 62 of the ratchet wheel 60 to lock the same. It should be noted that when the solenoid in the casing 104 is deenergized, the lever 92 returns to its dormant position wherein the teeth 94 of the lever 92 are disengaged from the teeth 62 of the ratchet wheel 60 by the force of the spring 96. This returning movement of the lever 92 is made through drawing the plunger 106 out from the casing 104.

Although not shown in the drawings, the webbing 36 is provided with a well known tongue and buckle unit having a switch which functions to provide electrical connection between the solenoid in the casing 104 and an electric power source (not shown) when the tongue and buckle are engaged for restraining the passenger with the webbing 36.

With the above, the seat belt retractor of the invention will operate as follows:

When the tongue and buckle of the webbing 36 are kept disengaged causing deenergization of the solenoid of the electric actuator 102, the lever 92 takes the dormant position releasing the ratchet wheel 60 in a manner as shown in FIG. 3A. With this, the shaft 28 and thus the reel 26 are urged to wind thereon the webbing 36 by the force generated by the return spring 46. Under rotation of the reel 26 in the clockwise, the planetary gear 64 orbits in the clockwise direction around the center of the internal gear 84 while engaging the external teeth 68 thereof with the internal teeth 86 of the internal gear 84 causing rotation of the planetary gear 64 around the center thereof in the counterclockwise direction. Now, it should be noted that during this movement of the planetary gear 64, the stud 68 moves around the center of the internal gear 84 in the counterclockwise direction while describing a epitrochoidal path in the slot 70, pushing the end section 70a of the slot 70 resulting in that the ratchet wheel 60 rotates about the concentric bearing portion 56 of the reel 26 in the counterclockwise direction. Further, it should be noted that under this condition the webbing 36 wound on the reel 26 is drawn out from the reel 26 against the biasing force of the return spring 46.

When the tongue and the buckle are engaged, after drawing sufficient webbing out from the reel 26 to permit donning of the webbing to restrain the seated passenger, the switch arranged in the tongue and buckle unit closes to energize the solenoid of the electric actuator 102 thereby retracting the plunger 106 toward the casing 104. Thus, the stopping lever 92 more specifically the teeth 94 of it is brought into engagement with the teeth of the ratchet wheel 60 against the force of the spring 96 thereby preventing rotation of the disc-ratchet 60 in the counterclockwise direction. The stopping lever 92 and the ratchet wheel 60 cooperate to provide the retractor arrangement with a position memory wherein the just mentioned engagement of the stopping lever 92 and the ratchet wheel 60 establishes an initial "memorizing or memory" position. The operation and function of the position memory will become clearer as the disclosure proceeds. Now since the counterclockwise rotation of the ratchet wheel is suppressed, clockwise orbiting of the planetary gear around the center of the internal gear 84 is prevented due to the blocking engagement of the stud 68 with the end section 70a of the slot 70. Thus, the webbing winding motion of the reel 26 by the return spring 46 is not provided. This means that the passenger wearing the webbing is applied with no pressure from the webbing 36 as long as the passenger keeps his or or her normal seated position viz., sits back against the back rest of the seat.

Under this condition, if the seated passenger leans forward as for example in opening the glove locker, the webbing 36 will be drawn off the reel 36 forcing the same to rotate in the counterclockwise direction. This rotation of the reel 26 is of course made against the biasing force of the return spring 46 and causes the stud 68 of the planetary gear 64 to travel, describing an epitrocoidal path, in the slot 70 from the end section 70a toward the other end section 70b, for example to a position as denoted by numeral 68' in FIG. 3B. Of course, when the seated passenger stops moving forward, the stud 68' stops due to the non movement of the webbing 36. When the passenger returns to the normal seated position, the length of the webbing 36 corrsponding to the returning movement of the passenger is wound up on the reel 26 by the action of the return spring 46. During this winding motion of the reel 26, the stud 68' comes back to and presses upon the end section 70a of the slot 70. Since the rotation of the ratchet wheel 60 in the counterclockwise direction is blocked by the stopping lever 92 in this this condition, the engagement of the stud 68 with the end section 70a does not cause the rotation of the ratchet wheel 60 in that direction. This means that the webbing 36 returns to its previously set or memorized position.

If, however, the forward movement of the seated passenger from the normal position is quite pronounced, the stud 68 of the planetary gear 64 is brought into contact with the upper end section 70b of the slot 70 to urge the ratchet wheel 60 to rotate in the clockwise direction. Since the clockwise rotation of the ratchet wheel 60 is permitted via the nature of the engagement between the stopping lever 92 and the ratchet wheel 60, the contact of the stud 68 with the end section 70b causes the clockwise rotation of the ratchet wheel 60 cancelling the previously memorizing position of the ratchet wheel 60. Thus, the length of the webbing 36 corresponding to the rotation of the ratchet wheel 60 can not be retracted by the reel 26 even when the seated passenger returns to the normal seated position, so that a considerable amount of slack is provided in the webbing 36. In this case, the seated passenger should disconnect the tongue from the buckle for resetting the webbing 36 for the preferable restraining of the webbing 36 to the seated passenger.

It is to be appreciated that the length of the webbing 36 which can be retracted by the reel 28 once the ratchet wheel 60 has been set in a given memorizing position thereof depends on the longitudinal length of the slot 70 of the ratchet wheel 60, the ratio of the number of the teeth 86 of the internal gear 84 to that of the planetary gear 64, and the diameter of the reel 26. In the disclosed seat belt retractor in which the numbers of the teeth 80 and 66 of the internal and planetary gears 84 and 64 are 30 (thirty) and 29 (twenty nine) and the slot 70 is defined substantially within one quadrant of the ratchet wheel 60, about 120 mm length of the webbing 36 can be drawn out without moving the ratchet wheel to a new "memorizing" position.

When the passenger disconnects the tongue from the buckle, the solenoid of the electric actuator 102 becomes deenergized thereby disengaging the stopping lever 92 from the ratchet wheel 60 by the force of the spring 96. Thus, the reel 26 is permitted to rotate in the clockwise direction under the biasing force of the return spring 46, winding up thereon the webbing 36.

The following description is directed to the mathmaterical relationship established between the planetary gear 64 and the internal gear 84.

Assuming that the respective radii of the internal and planetary gears 84 and 64 are $R_1$ and $R_2$, and the numbers of teeth of the same are $Z_1$ and $Z_2$, one turning of the reel 26 causing one orbit of the planetary gear 64 around the center of the internal gear 84 will cause the planetary gear 64 to rotate about its center $2\pi(R_2-R_1)/R_2$ times. Thus, the rotational speed ratio of the planetary gear 64 with respect to the internal gear 84 is expressed by $2\pi(R_2-R_1)/R_2/2\pi=(R_2-R_1/R_2=(Z_2-Z_1)/Z_2$. If $Z_2=30$, $Z_1=29$ as is preferred in the disclosed embodiment, the rotational speed ratio is represented by $(29-30)/30=-1/30$. (It should be noted that appearance of negative value of the ratio indicates that the planetary gear 64 turns about its center in the opposed direction with respect to the turning of the same around the center of the internal gear 84.)

From the above, it will be appreciated that the rotation of the planetary gear 64 about its center is remarkably reduced in comparison with the oribiting of the same around the center of the internal gear 84, that is in comparison with the rotation of the reel 26 about the axis thereof. Thus, a considerable length of the webbing 36 can be drawn out from or retracted by the reel 26 without being influenced by the ratchet wheel 60 or moving the latter to a new "memorizing" position even though the slot 70 is relatively small as illustrated in the drawings.

The foregoing description shows only one preferred embodiment of the present invention. Various modifications are apparent to those skilled in the art without departing from the scope of the subject invention which is only limited by the appended claims. Therefore, the embodiment shown and described only illustrative, not restrictive.

What is claimed is:

1. A belt retractor for a safety belt arrangement having a webbing; comprising:
   a housing;
   a reel axially rotatably mounted in said housing, said webbing being connected at its one end to said reel so as to be wound on said reel when the reel rotates about the axis thereof in one direction, said reel being formed at the longitudinal end thereof with first and second bearing portions which are respectively concentric and eccentric with respect to the longitudinal axis of the reel;

first biasing means for biasing said reel to rotate in said one direction;

a wheel journaled on said first bearing portion;

a stopper engageable with said wheel to prevent rotation of said wheel about its axis in opposite direction with respect to said one direction of said reel while permitting rotation of same in the same direction as said one direction;

second biasing means for biasing said stopper to move in a direction to be disengaged from said wheel;

a planetary gear journaled on said second bearing portion of said reel;

third biasing means for biasing said wheel to rotate in the same direction as said one direction relative to said planetary gear;

an internal gear stationarily connected to said housing at a position to be operatively engageable with said planetary gear;

said planetary gear having a projection which is spacedly received in an arcuate opening formed in said wheel, said arcuate opening having the same center as said wheel; and actuating means for causing said stopper to be brought into engagement with said wheel against the force of said second biasing means when said webbing takes the passenger restraining position.

2. A belt retractor as claimed in claim 1, in which said wheel is a ratchet wheel and said stopper is a ratchet pawl.

3. A belt retractor as claimed in claim 2, in which said first, second and third biasing means are springs.

4. A belt retractor as claimed in claim 3, in which the spring of said third biasing means is received in a circular recess formed in said planetary gear.

5. A belt retractor as claimed in claim 2, in which said ratchet pawl is pivotally mounted on an arm portion which extends from said internal gear.

6. A belt retractor as claimed in claim 1, in which said actuating means is an electric actuator having a plunger engageable with said stopper, said plunger moving in a direction to cause said stopper to be brought into engagement with said wheel when said electric actuator is energized.

7. A belt retractor as claimed in claim 1, further comprising an emergency locking mechanism with is cooperated with said reel to lock the rotation of said reel preventing the feeding of the webbing from the reel when a predetermined condition is sensed by said locking mechanism.

* * * * *